Nov. 21, 1967     J. HALLER     3,353,215

POWDERED MATERIAL BRIQUETTING PRESS

Filed Nov. 10, 1965     9 Sheets-Sheet 1

INVENTOR
JOHN HALLER
BY Barthel & Bugbee
ATTORNEYS

Nov. 21, 1967 — J. HALLER — 3,353,215
POWDERED MATERIAL BRIQUETTING PRESS
Filed Nov. 10, 1965 — 9 Sheets-Sheet 2

INVENTOR
JOHN HALLER

Nov. 21, 1967  J. HALLER  3,353,215
POWDERED MATERIAL BRIQUETTING PRESS
Filed Nov. 10, 1965  9 Sheets-Sheet 3
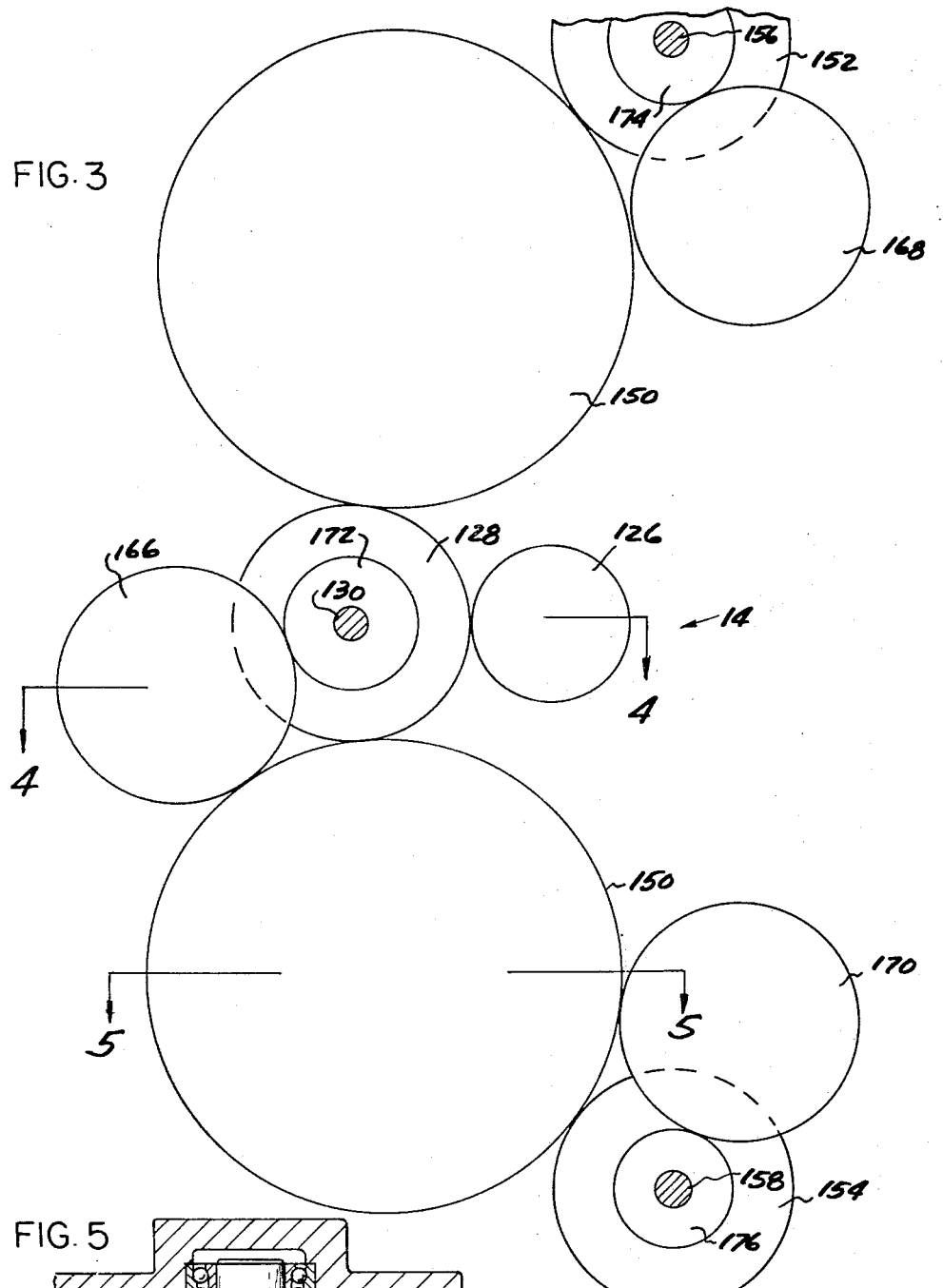
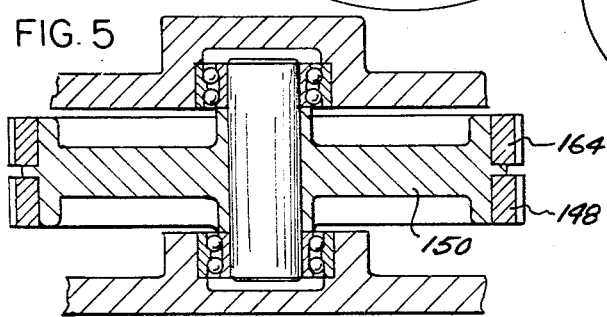
INVENTOR
JOHN HALLER
BY *Barthel & Bugbee*
ATTORNEYS

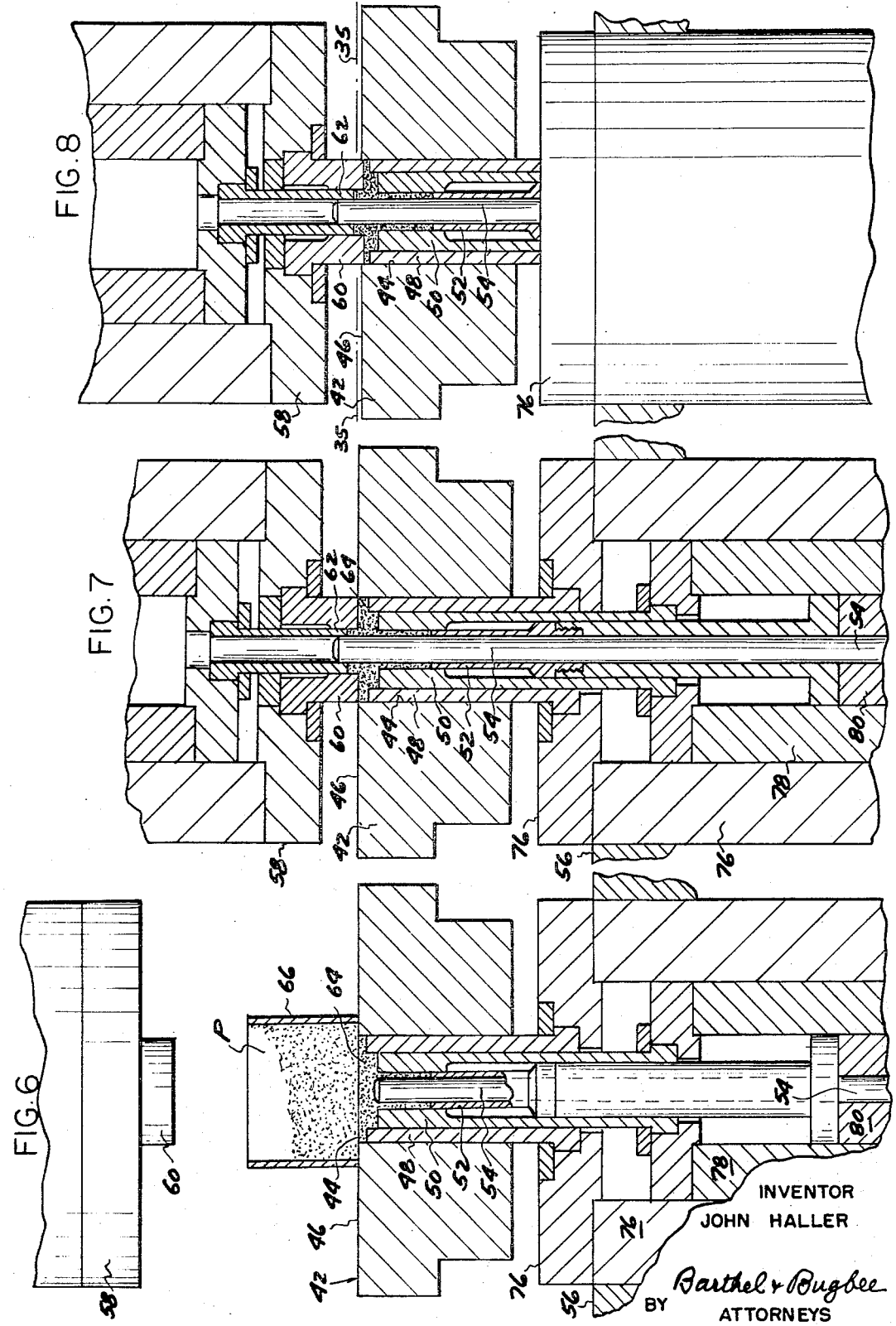

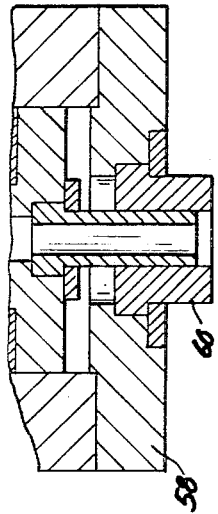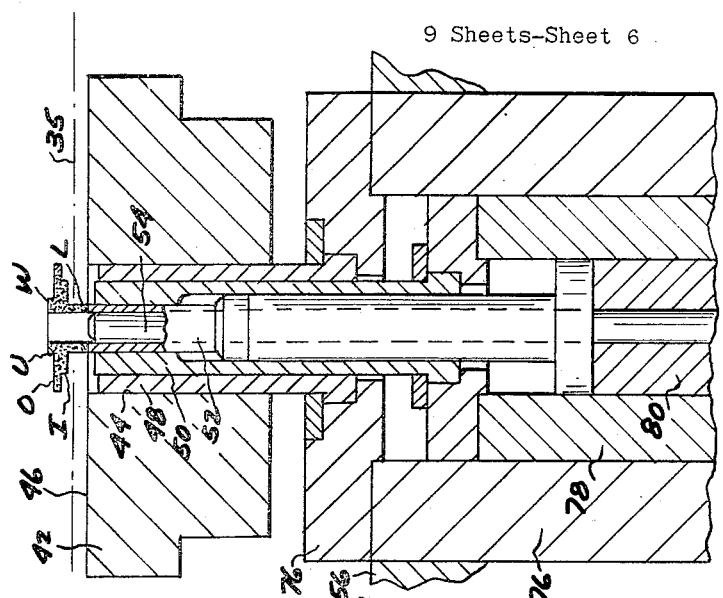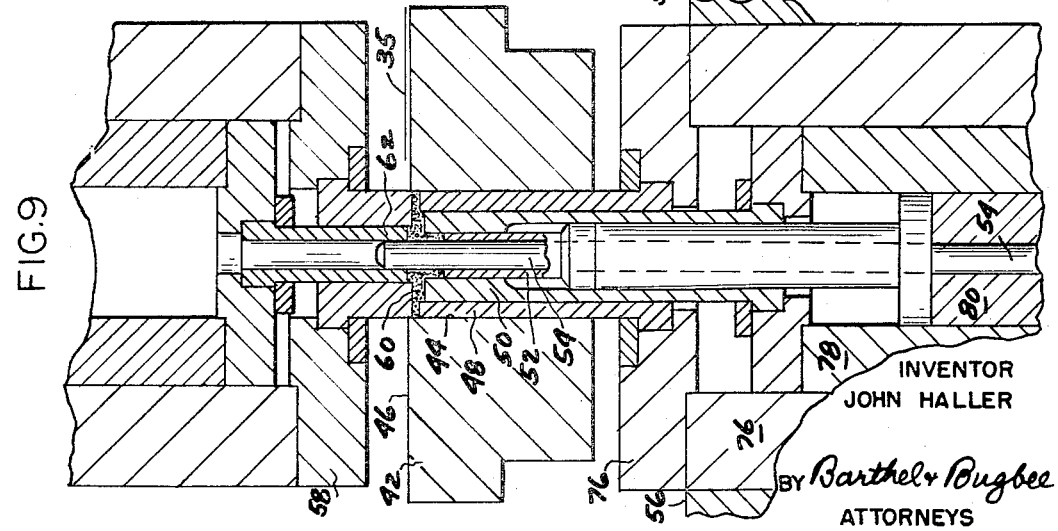

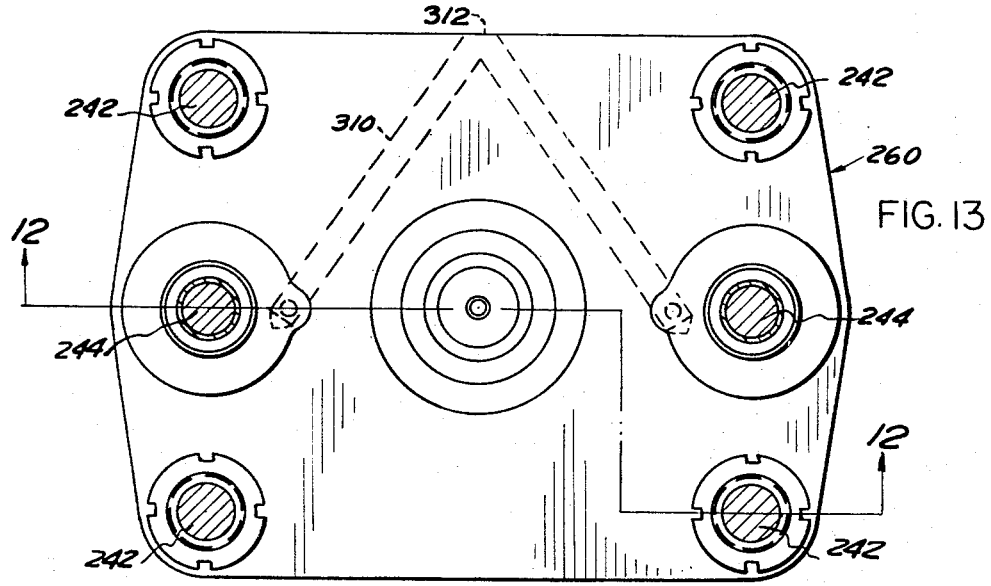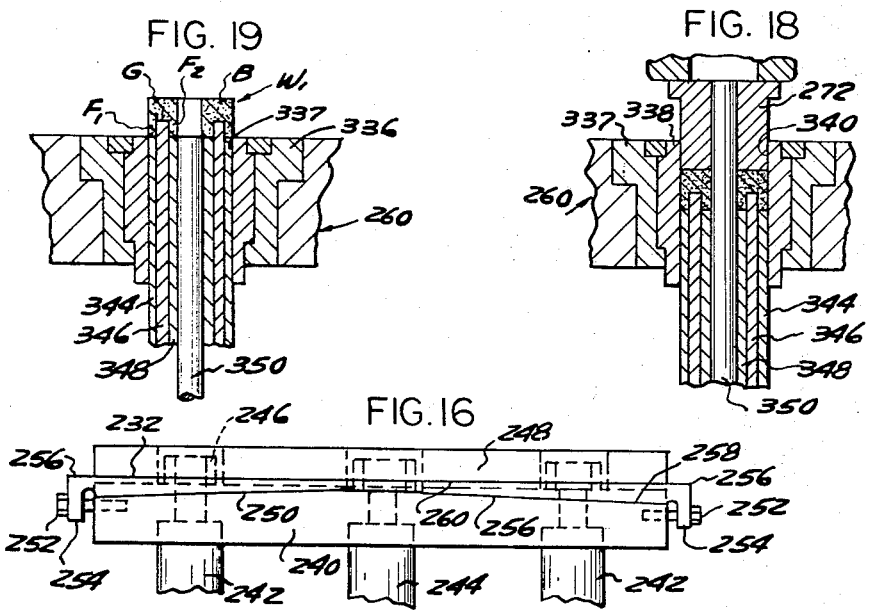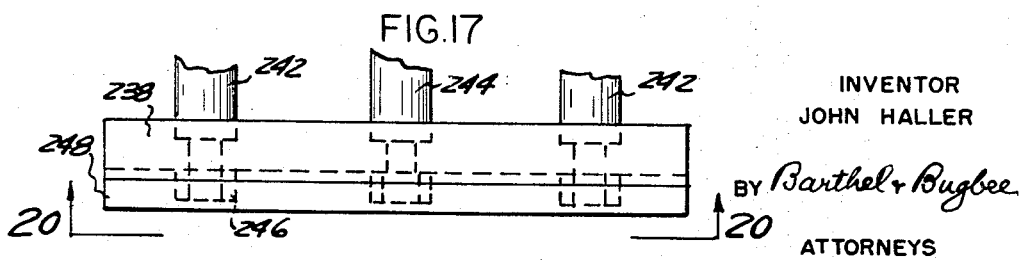

Nov. 21, 1967   J. HALLER   3,353,215
POWDERED MATERIAL BRIQUETTING PRESS
Filed Nov. 10, 1965   9 Sheets-Sheet 9
FIG. 20
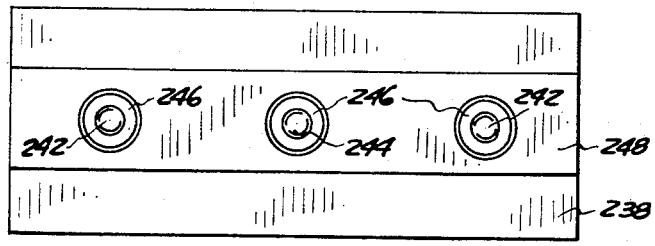
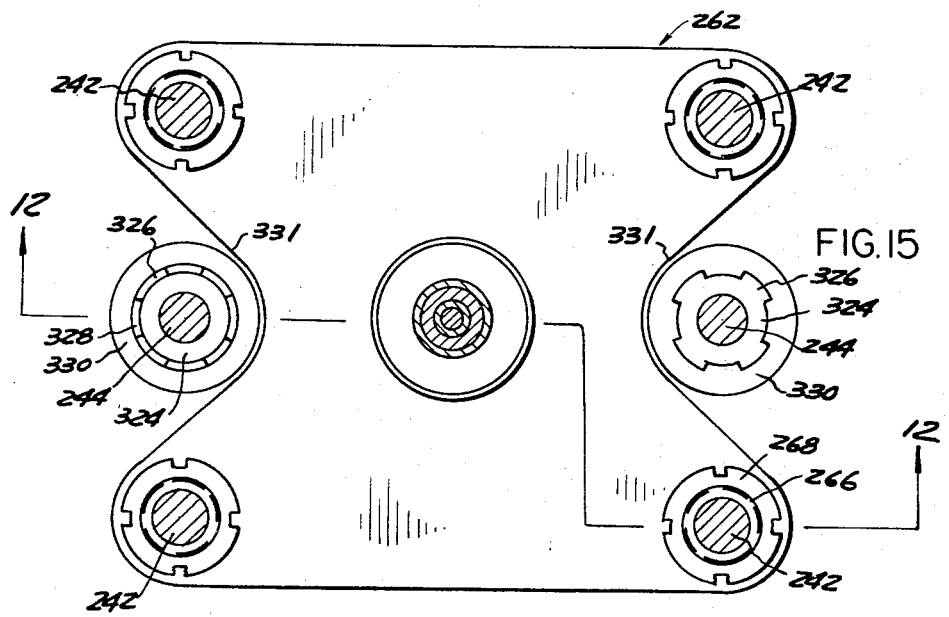
FIG. 15
FIG. 14
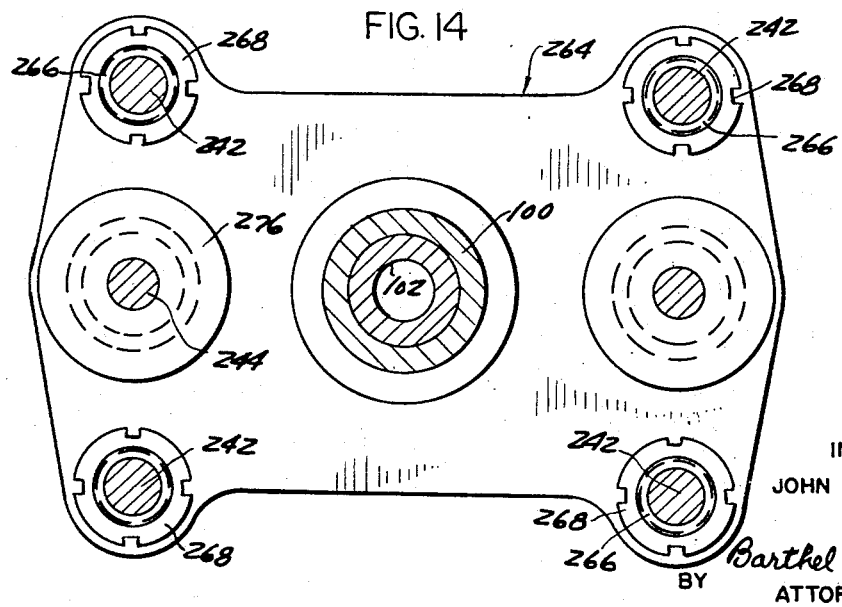
INVENTOR
JOHN HALLER
BY Barthel & Bugbee
ATTORNEYS

United States Patent Office 3,353,215
Patented Nov. 21, 1967

3,353,215
POWDERED MATERIAL BRIQUETTING PRESS
John Haller 18500 Sheldon Road,
Northville, Mich. 48167
Filed Nov. 10, 1965, Ser. No. 507,090
12 Claims. (Cl. 18—16.7)

This invention relates to briquetting presses for compacting powdered materials into desired workpiece shapes before sintering.

The objects of this invention are to provide a screw-operated briquetting press which is more economical, less expensive, more accurate and less noisy than hydraulic briquetting presses and not subject to their leakage; also having screw plungers, preferably of tubular coaxial form, which can be operated by electric motors either with limit switch or tape control, and which may eject the briquette from the die cavity by reverse stripping which employs as much force, if necessary, as the compacting force, in contrast to the comparatively weak stripping force available in hydraulic briquetting presses; and also which, by using selectively-operated magnetic clutches, enables the employment of a single electric motor for reversibly driving each set of plungers in the upper and lower portions of the press, thereby eliminating the need for an individual reversible electric motor for each plunger of each set.

In the drawings, FIGURE 1 is a front elevation, with the midportion in central vertical section, of a screw-operated briquetting press according to one form of the invention;

FIGURE 3 is a diagrammatic elevational view of the gearing between the driving motor and the screw plunger of the lower actuating mechanism assembly of FIGURE 1;

FIGURE 5 is a horizontal section taken along the line 5—5 in FIGURE 3;

Figure 1:
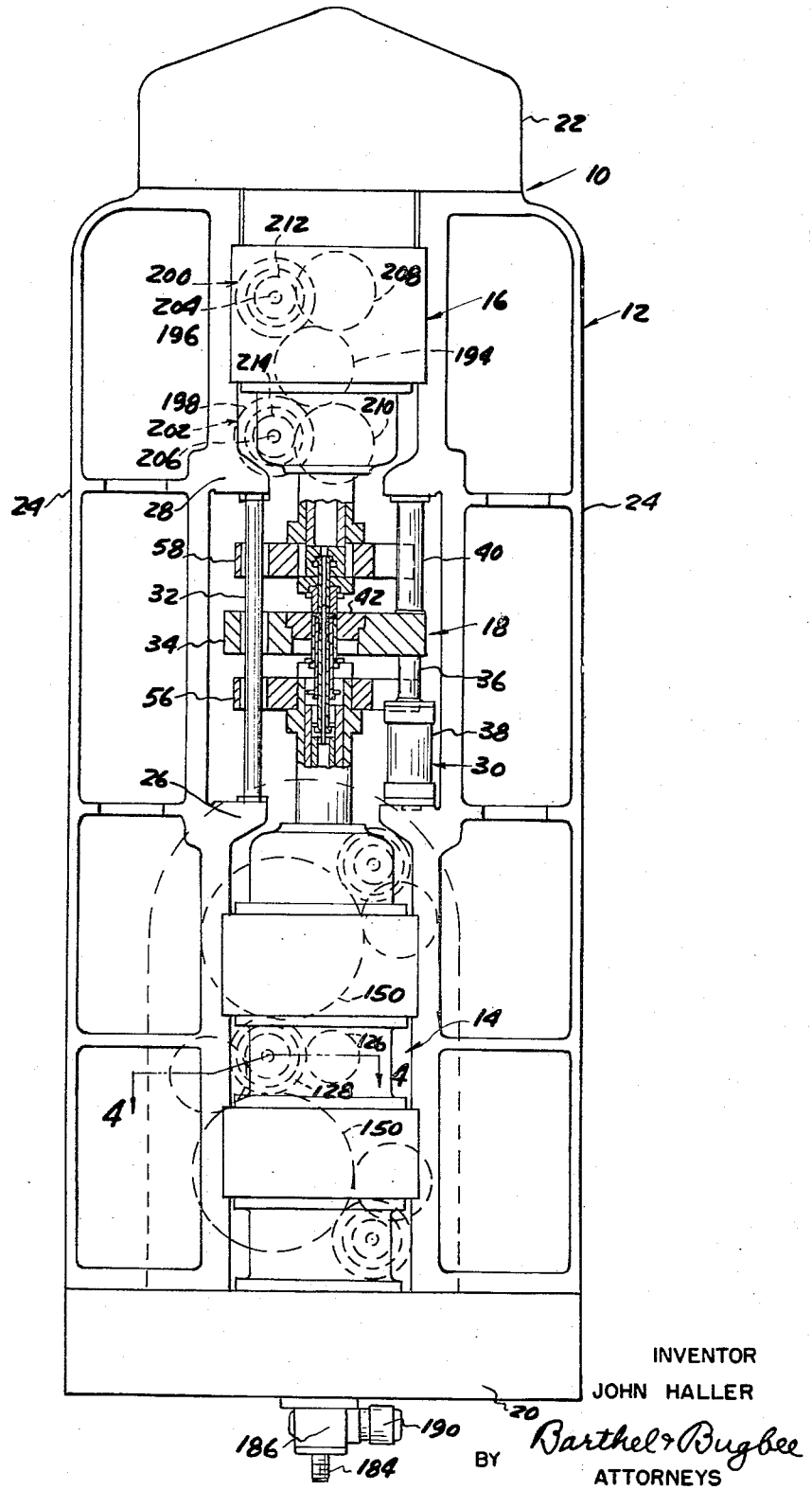
Figure 12:
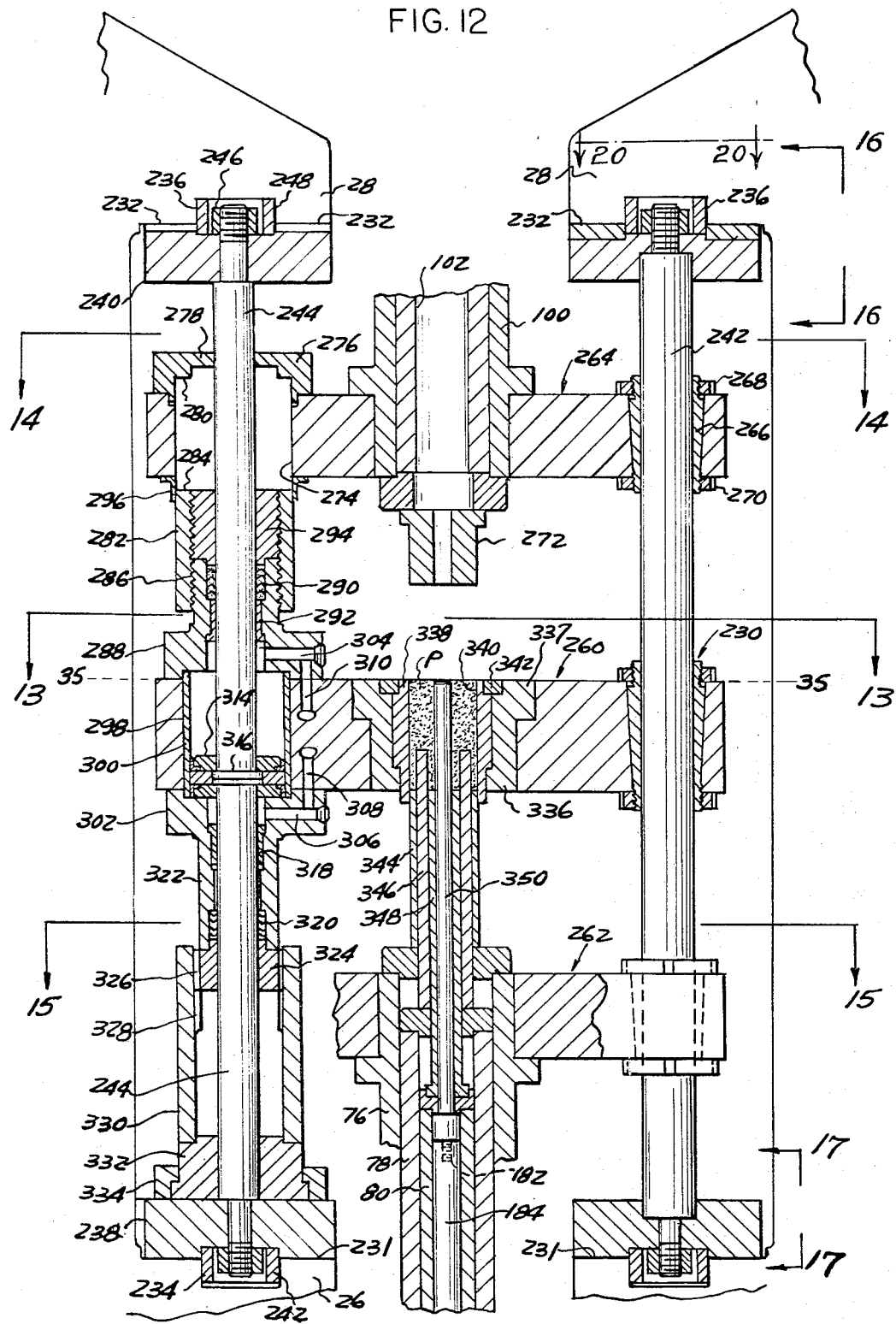

FIGURES 6 to 11 inclusive are enlarged fragmentary views of the central vertical section of FIGURE 1, showing the successive positions of the moving parts in the successive steps in a cycle of operation of the press;

FIGURE 12 is an enlarged vertical section taken along the line 12—12 in FIGURES 13, 14 and 15, of a modified powdered-material compacting assembly for substitution in the midportion of the press of FIGURE 1, showing an arrangement for briquetting another form of workpiece, with the die cavity filled and ready for the pressing operation;

FIGURES 13, 14 and 15 are horizontal sections taken along the lines 13—13, 14—14 and 15—15 respectively in FIGURE 12;

FIGURES 16 and 17 are fragmentary side elevations, looking in the direction of the arrows 16—16 and 17—17 respectively in FIGURE 12;

FIGURE 18 is a fragmentary central vertical section similar to the central portion of FIGURE 12, but showing the relative positions of the punches at the end of the pressing stroke;

FIGURE 19 is a view similar to FIGURE 16, but showing the relative positions of the punches at the completion of the ejection of the workpiece; and FIGURE 20 is a plan view of the portion of the press taken along the line 20—20 in FIGURE 12.

General Arrangement

Figure 2:
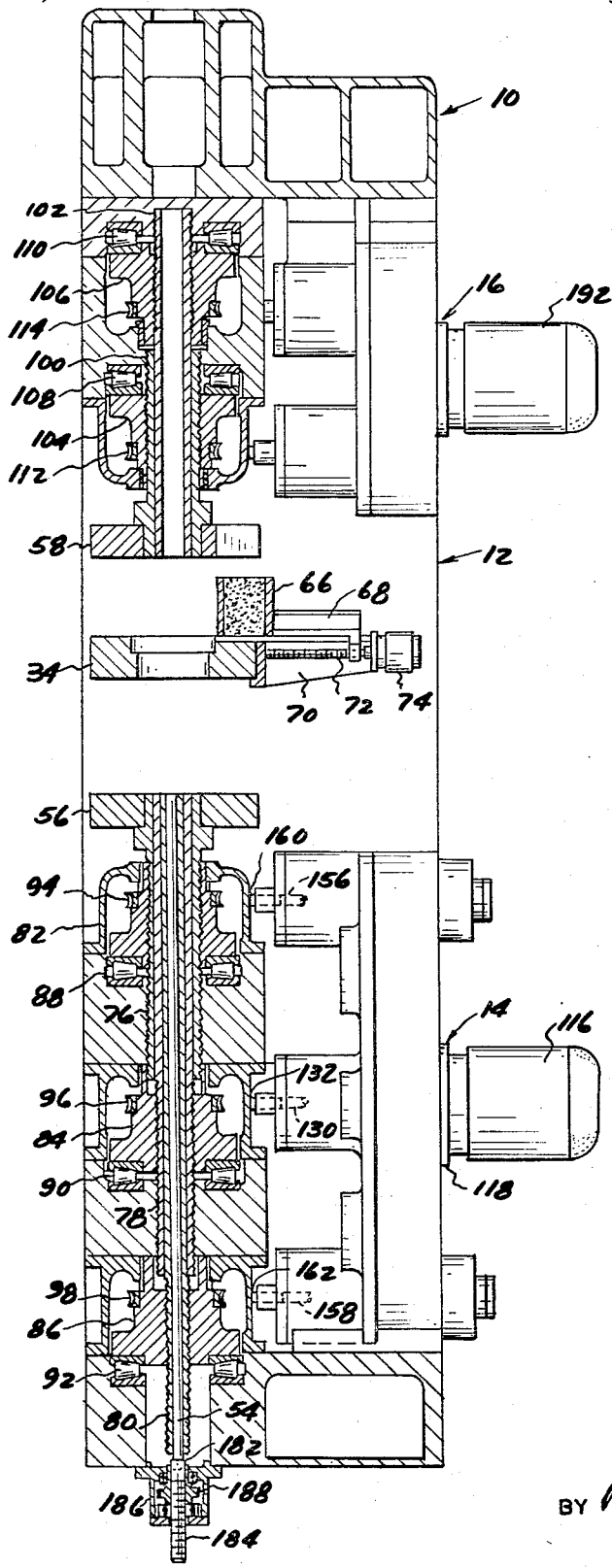
FIGURE 2 is a right-hand side elevation of the press of FIGURE 1, with the left-hand portion in central vertical section.

In general, the screw-operated briquetting press, generally designated 10, of FIGURES 1 and 2 consist of a hollow press frame formation 12 with lower and upper actuating mechanism assemblies 14 and 16 for operating the powdered-material compacting assembly 18 in the approximate mid-portion of the press 10. The press frame formation 12 includes a hollow base structure 20 and a hollow head structure 22 interconnected by hollow vertical side structures 24 serving both as housings and strain rods. The side structures 24 near their midportions have vertically-spaced inwardly-extending lower and upper shelf-like arms 26 and 28. Mounted on the lower arms 26 are four hydraulic die table cushioning devices 30 (only one of which is shown in FIGURE 1) with their axes arranged at the corners of a rectangle. Mounted on the side member arms 26 and 28 between each pair of cushioning devices 30 is a vertical guide rod 32.

Reciprocable vertically and extending between the guide rods 32 and cushioning devices 30 is an approximately rectangular die table 34 which rests upon and is operatively connected to the upper ends of the piston rods 36, the latter having piston heads (not shown) reciprocable within the cylinders 38 of the hydraulic cushioning devices 30. It will be understood that the cylinders 38 of the hydraulic cushioning devices 30 are provided with hydraulic fluid ports (not shown) connected to a conventional pressure-responsive hydraulic cushioning circuit adapted to permit the piston rods 36 and die table 34 to yield downward from a starting level 35 in response to the attainment of a predetermined pressure within the cylinders 38 of the hydraulic cushioning devices 30 and to return the die table 34 to its upper portion of FIGURE 1 at the end of each operating cycle. Extending downwardly from the upper arms 28 of the frame side structures 24 into engagement with the top of the die table 34 are four stop rods 40 coaxial with the piston rods 36. The die table 34 is bored vertically for the passage of the guide rods 32 and centrally for the reception of a compacting die 42, shown more fully in FIGURES 6 to 11 inclusive.

The die 42 is provided with a central die bore 44 extending downward therethrough from its upper surface 46 (FIGURES 6 to 11) and containing a flanged tubular lower outer punch 48 within which is reciprocably mounted a flanged tubular lower intermediate punch 50. Reciprocably mounted within the intermediate punch 50 is a flanged tubular lower inner punch 52. Reciprocably mounted within the inner punch 52 is a central core rod 54. The lower punches 44, 48, 50 and 52 and core rod 54 are movable independently of one another by mechanism described below. The outer lower tubular punch 48 is seated and secured at its flanged lower end in a correspondingly-recessed rectangular lower platen 56 which is disposed below the die table 34 and extends laterally past the guide rods 32 and piston rods 36 and is bored and cut away respectively for passage thereof (FIGURE 1).

An approximately rectangular upper platen 58 disposed above the die table 34 is bored and cut away respectively for the passage of the guide rods 32 and stop rods 40 in a manner similar to the lower platen 56. Thus, the guide rods 32 also prevent rotation of the die table 34 and upper and lower platens 58 and 56. The upper platen 58, similarly to the lower platen 56, is recessed for the reception of a flanged upper outer tubular punch 60 secured therein at its flanged upper end (FIGURES 6 to 11). Reciprocably mounted within the outer tubular punch 60 is a flanged upper tubular inner punch 62 which is bored to snugly but slidably receive the core rod 54.

The above-described die and upper and lower punches are operated in the manner shown in FIGURES 6 to 11 to produce a briquette or compact constituting a complex workpiece W. The workpiece W is shown, for purposes of illustration, as including, for example, upper and lower tubular hubs U and L and, between these, annular stepped outer and inner flanged portions O and I integral therewith. The workpiece W is formed by the press 10 from powdered material P (FIGURE 6), such as powdered metal or powdered nylon and is subsequently sintered by procedures well known to those skilled in the powder metallurgy art.

For the purpose of filling with powdered material P the die cavity 64 formed by the die bore 44 and the various punches and the core rod, there is provided a hollow bottomless reciprocable filling shoe or hopper 66 (FIGURES 2 and 6) which is movable back and forth across the mouth of the die bore 44 upon the upper die surface 46 by an L-shaped arm 68 reciprocable in a slotted bracket 70 secured and extending rearwardly from the rearward end of the die table 34 and threaded at its lower end to threadedly engage a screw shaft 72 journaled at its opposite ends in the bracket 70 and coupled to the rotary shaft of a reversible electric motor 74. The electric motor 74 is connected in a suitable electric circuit (not shown) to operate in timed relationship with the other elements of the press 10 so as to advance the filling shoe 64 over the die bore 44 so as to fill the die cavity 62 at the beginning of the cycle of operation shown in FIGURE 6, and to be immediately retracted to its rearward position of FIGURE 2, the upper platen 58 being cut away for clearance of the filling shoe 64 upon its downward stroke.

Punch-moving mechanism

Each of the above-described punches 48, 50, 52, 60 and 62 is moved upward or downward by its own individual tubular screw shaft or screw plunger which in turn is held against rotation while moved upward or downward by a rotary gear nut threaded upon it and driven through the lower or upper actuating mechanism assemblies 14 and 16 by way of selectively-operated magnetic clutches. In particular, the tubular lower outer punch 48 (FIGURES 6, 7, 9 and 11), intermediate punch 50 and inner punch 52 are coupled respectively to lower outer, intermediate and inner tubular screw shafts or screw plungers 76, 78 and 80 which telescope with one another and are threaded along their lower end portions as well as being keyed, splined or otherwise held against rotation. Threaded upon the threaded lower end portions of the screw plungers 76, 78 and 80 respectively (FIGURE 2) are rotary gear nuts 82, 84 and 86 resting upon roller thrust bearings 88, 90 and 92, which in turn are supported by the frame formation 12. The gear nuts 82, 84 and 86 are so designated for conciseness because they are internally-threaded to threadedly engage their respective screw plungers 76, 78 and 80 and at their upper ends are provided with annular toothed worm wheel portions 94, 96 and 98 respectively, by which they are rotated by means of the lower actuating mechanism assembly 14.

Similarly, the upper outer punch 60 and upper inner punch 62 are coupled respectively to upper outer and inner tubular rams or screw plungers 100 and 102 which telescope with one another and are threaded along their upper end portions as well as being keyed, splined or otherwise held against rotation. Threaded upon the threaded upper end portions of the screw plungers 100 and 102 respectively are gear nuts 104 and 106 bearing against the roller thrust bearings 108 and 110, which in turn are supported by the frame formation 12. The gear nuts 104 and 106 are also internally threaded to engage their respective screw plungers 100 and 102, and at their lower ends are provided with annular toothed worm wheel portions 112 and 114 by which they are rotated by means of the upper actuating mechanism assembly 16.

Lower mechanism assembly

Figure 4:
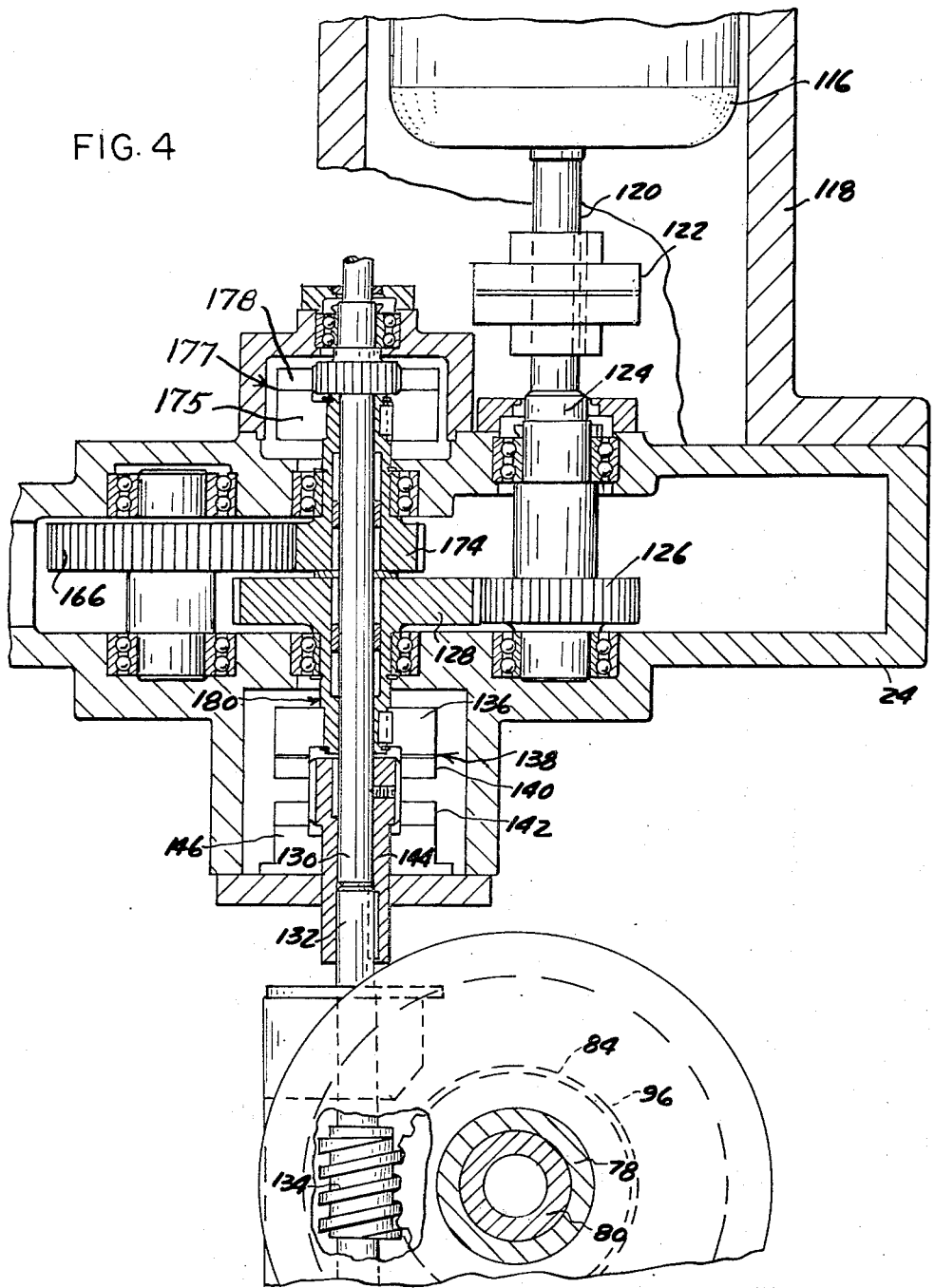
FIGURE 4 is a horizontal section taken along the line 4—4 in FIGURES 1 and 3.

The lower mechanism assembly 14 is shown diagrammatically in FIGURE 3 and in detail in FIGURES 4 and 5, and is driven by a variable speed motor 116 mounted in a housing 118 bolted or otherwise secured to the frame formation 12. The rotary motor shaft 120 is coupled as at 122 to the hub 124 of a driving gear 126 (FIGURE 4) with which meshes the driven gear 128, the hub of which is loosely and rotatably mounted upon a middle output shaft 130. Keyed or otherwise drivingly secured to the outer end of a worm shaft 132 coaxial with the output shaft 130 is a cone drive worm or pinion 134 which in turn meshes with the annular worm wheel portion 96 of the gear nut 84 (FIGURE 2).

The hub of the gear 128 is keyed or otherwise drivingly secured to the driving element 136 of an automatically-braking magnetic clutch 138, the driven clutch element 140 and the rotary magnetic brake element 142 of which are keyed to a tubular shaft 144 which in turn is keyed to the output shaft 130 and also to the worm shaft 132 (FIGURE 4). The rotary brake element 142 is engaged by a stationary brake element 146 fixedly mounted on the adjacent press frame side structure 24. As is well known to electrical engineers, the braking magnetic clutch 138 is so connected in the electric circuit that when the magnetic clutch 136, 140 is energized, the magnetic brake 142, 146 is de-energized and vice versa, for the purpose of preventing overrunning of the output shaft 130 and worm shaft 132.

The driven gear 128 (FIGURES 3 and 5) meshes with the forward ring gear 148 of each of a pair of double ring gear idlers 150 (FIGURE 5) located above and below the driven gear 128. The forward ring gears 148 of the idlers 150 in turn mesh directly with gears 152 and 154 respectively (FIGURE 3) selectively drivingly connected to upper and lower output shafts 156 and 158 through automatically-braking magnetic clutches (not shown) similar to the braking magnetic clutch 138 of FIGURE 4. The upper and lower output shafts 156 and 158, like the middle output shaft 130, are connected to worm shafts 160 and 162 respectively carrying worms (not shown) similar to the worm 134 and similarly meshing with the worm wheel portion 94 or 96 of the gear nut 82 or 86 on the screw plunger 76 or 80 respectively. The gearing just described actuates the three screw plungers 76, 78 and 80 and their connected tubular punches 48, 50 and 52 respectively in an upward or forward pressing stroke.

Returning to the double ring gear idlers 150 (FIGURES 3 and 5), meshing with the rearward ring gear portion 164 is a central idler 166 and also upper and lower idlers 168 and 170 respectively. The idlers 166, 168 and 170 in turn mesh with upper, middle and lower pinions 172, 174 and 176 respectively loosely and rotatably mounted upon their respective upper, middle and lower output shafts 156, 130 and 158. The hub of the pinion 172 is keyed to the driving clutch element 175 of a magnetic clutch 177, the driven element 178 of which is keyed or otherwise drivingly connected to the middle output shaft 130. The electric control circuit is so arranged that when the magnetic clutch 177 is energized, the magnetic clutch 136, 140 of the magnetic braking clutch 138 is de-energized, and the motor 116 then moves the screw plunger 78 downward rapidly upon its retraction or return stroke.

In a similar manner, the hubs of the upper and lower pinions are selectively drivingly connected through magnetic clutches (not shown), similar to the magnetic clutch 177, to their respective output shafts 156 and 158 (FIGURE 3), for rapid retraction of their respective screw plungers 76 and 80 (FIGURE 2). Since the reversible clutching assembly including the power transmission gearing and clutches mounted on and adjacent the shaft 130 is substantially repeated in the upper actuating mechanism assembly 16, it is conveniently generally designated by the reference numeral 180 and includes the gear 128, shafts 130 and 132, worm 134, magnetic clutch and brake assembly 138, double ring gear idler 150, gears 166 and 174 and magnetic clutch 177. It will be observed from FIGURE 4 that the various gears and shafts described above have been mounted in conventional anti-friction bearings for smooth and efficient operation, and this also applies to the additional gears shown diagrammatically in FIGURE 3. It is believed that these bearings require no detailed description since they are conventional and do not form a part of the invention.

Core rod actuation

The core rod 54 (FIGURES 6 and 11) is actuated independently of the lower and upper actuating mechanism assemblies 14 and 16 in that it has a jointed connection 182 at its lower end (FIGURE 2) with a screw shaft 184 passing through a housing 186 secured to the bottom of the bed structure 20 and keyed, splined or otherwise held against rotation. Threadedly engaging the screw shaft 184 is a gear nut 188 consisting of a worm wheel with its hub internally threaded to mate with the screw shaft 184 and engaged by a worm (not shown) mounted on the drive shaft of a reversible electric motor 190 (FIGURE 1). The motor 190 is so connected in the electrical control circuit that it is movable in a forward or reverse direction during the operation of the general circuit to rotate the gear nut 188 in a forward or reverse direction and consequently to move the screwshaft 184 and core rod 54 upward or downward as shown in FIGURES 6 to 11.

Upper actuating mechanism assembly

The upper actuating mechanism assembly 16 mounted in the hollow head structure 22 is generally similar to the lower actuating assembly 14 but is simpler because it actuates only the two screw plungers 100 and 102. Power is obtained from an electric motor 192 (FIGURE 2) which rotates constantly in one direction like the lower driving motor 116 to rotate a double ring gear 194 (FIGURE 1) similar to the double ring gear idlers 150 with one of its ring gears directly driving upper and lower gears 196 and 198 respectively of upper and lower reversible clutching assemblies 200 and 202, generally similar to the reversible clutching assembly 180 shown in the central portion of FIGURE 4 and similarly employing worm driving shafts 204 and 206 which in turn drive the gear nuts 106 and 104 (FIGURE 2) on the inner and outer upper schewshafts 102 and 100. The second ring gear of the double ring gear 194 drives upper and lower idlers 208 and 210 which in turn reversely drive upper and lower reversing gears 212 and 214 loosely and rotatably mounted on the upper and lower shafts 204 and 206. Magnetic clutching brakes and clutches similar to the magnetic clutching braking assembly 138 and magnetic clutch 177 of FIGURE 4 selectively drivingly connect either the forward drive gears 196 and 198 or the reverse gears 212 and 214 to their respective shafts 204 and 206 in a manner similar to that described above in connection with FIGURES 3, 4 and 5. Clutching in the forward driving gears 200 and 202 causes the gear nuts 106 and 104 to drive the upper inner and outer screw plungers 102 and 100 downward in the manner shown in FIGURES 6 to 11, whereas clutching in the reversing gears 212 and 214 rapidly retracts the screw plungers 102 and 100.

Operation

The operation of the individual mechanical elements and subassemblies has been described above in connection with their construction. In the operation of the screw-actuated briquetting press 10 as a whole (FIGURES 1 and 11), let it be assumed that the moving parts are in their retracted or starting positions shown in FIGURE 2 and that the filling shoe or hopper 66 has been filled with suitable powdered material P, also that the lower punches 48, 50 and 52 and core rod 54 have been moved to their positions shown in FIGURE 6, and that the upper punches 60 and 62 have been moved into their relative positions shown in FIGURE 7, but retracted as shown in FIGURE 6. During the first step of operation, the motor 74 (FIGURE 2) is actuated to rotate the screw shaft 72 in a forward direction and propel the filling shoe 66 over the die cavity 64 (FIGURE 6), whereupon the powdered material P falls into the die cavity 64. The control circuit then reverses the motor 74 to retract the filling shoe 66 to its rearward position shown in FIGURE 2.

The upper actuating mechanism assembly 16 is now operated (FIGURE 7) to move the upper punches 60 and 62 downward into the die cavity 64 while the core rod 54 is moved upward above the top surface 46 of the die 42, where it telescopes with the inner upper punch 62. This action partially compresses the powdered material in the die cavity 64 and causes it to fill all portions thereof as well as to rise around the core rod 54 into the space between the upper outer and inner punches 60 and 62. The die table 34 thus far remains with the upper surface 46 of the die 42 coincident with the starting level 35.

The upper outer and inner punches 60 and 62 now move downward (FIGURE 8) in the same axially-spaced relationship to compress the outer flange O (FIGURE 11), at the same time forcing the die table 34 and the upper surface 46 of the die 42 to move downward from the starting level 35 as the cushioning devices 30 operate to yield in response to the attainment of a predetermined pressure. The upper outer punch 60 now maintains its position (FIGURE 9) while the upper inner punch 62 is moved downward and the lower inner punch 52 is moved upward to compact the upper and lower hubs U and L. This descent of the die table 34 and die 42 while the lower outer and intermediate punches 48 and 50 remain stationary also causes compacting of the inner flange portion L. The workpiece W, which in this instance is a compacted unsintered briquette, has now been fully compacted and is ready to be ejected.

Ejection (FIGURES 10 and 11) is accomplished in two stages by reverse stripping, in order to prevent damage to the outer and inner flange portions O and I relatively to the upper and lower hubs U and L, since the briquette W is relatively fragile before sintering. The upper platen 58 and upper outer and inner punches 60 and 62 are moved upward to their retracted positions (FIGURE 10), while at the same time the cushioning devices 30 are operated to move the die 42 still further downward below the starting level 35 while the lower outer, intermediate and inner punches 48, 50 and 52 and core rod 54 remain stationary. This action withdraws the die 42 downward so that its bore 44 slides past the rim of the workpiece W, leaving the outer flange O exposed. Finally (FIGURE 11), the lower outer and intermediate punches 48 and 50 and core rod 54 are moved downward simultaneously while the lower inner punch 52 is moved upward to the level of the surface 46 of the die 42, ejecting the workpiece W. The latter is then removed, and the cushioning devices 30 operated to return the die table 34 and die 42 upward into the starting position with the upper die surface 46 coinciding with the starting level 35. The lower intermediate and inner punches 50 and 52 and core rod 54 are then moved downward from their positions shown in FIGURE 11 to positions below the level of the top of the lower outer punch 48 constituting their starting positions shown in FIGURE 6 and the press 10 is ready to execute another cycle of operation.

Unit disassembly arrangement of press

The screw-operated briquetting press 10 of FIGURES 1 and 2 is further so arranged that the forward and rearward halves (FIGURES 1, 2 and 4) of subassemblies of the lower and upper actuating mechanism assemblies 14 and 16 may be slid forwardly and rearwardly respectively as "package units" for repair or maintenance purposes, without the necessity of disturbing the press frame formation 12 and without removing either the base structure 12 or head structure 22 from the side structures 24.

Disconnection occurs at the keyed connection (FIGURE 4) between the tubular shaft 144 and worm shaft 132. For this purpose, the forward and rearward halves of the upper and lower mechanism assemblies 16 and 14 are mounted on slideways 220 and 222–224 respectively and slide adjacent the press head 22 at its lower surface 226 and the press bed 20 at its upper surface 228 respectively. The slideways 220 and 222–224 are formed in the inner faces of the hollow vertical side structures 24. These forward and rearward subassemblies of each mechanism assembly 16 or 14 when thus removed may be worked upon separately and the previously-necessary time-consuming complete disassembly of the frames of prior presses by disconnecting their heads and beds from their strain rods is completely avoided in the present press 10. In this manner, the "down time" of the press 10 is minimized during repair or replacement.

Furthermore, the powdered material compacting assembly 18, known as the "tooling" in the press industry, may be similarly removed without disturbing the press frame formation 12 and without disconnecting the head 22 or bed 20 from the vertical side structures 24. The detailed construction of the disconnecting arrangement for the guide rods 32 from the lower and upper shelf-like arms 26 and 28 is the same as shown at the four corners of FIGURE 12, upon a larger scale than was possible in FIGURE 1. The remainder of FIGURE 12, however, is for a modified powdered material compacting assembly, generally designated 230.

*Modified powdered material compacting assembly*

To facilitate unit removal of the powdered material compacting assembly 18 or 230, the lower and upper shelf-like arms 26 and 28 are machined flat and horizontal at 231 and 232 respectively and provided in the middle thereof with rearwardly-extending lower and upper horizontal grooves or keyways 234 and 236 respectively (FIGURE 12). Mounted in abutting relationship to the flat horizontal surfaces 231 and 232 on the lower and upper arms 26 and 28 are elongated lower and upper rectangular blocks 238 and 240 respectively, these being drilled vertically to receive the reduced diameter threaded lower and upper end portions of guide rods 242 and stationary piston rods 244 (FIGURES 12 and 13) carrying threaded retaining nuts 246. There are four guide rods 242 similar to the guide rods 32 of FIGURE 1 and arranged in a rectangular formation and two stationary piston rods 244 mounted between them. Mounted in each keyway 234 or 236 (FIGURE 12) is an elongated bar key 248 which in turn is bored to provide clearance for rotation of the nuts 246.

In order to clamp the powdered-material compacting assembly 18 tightly in position, the upper blocks 240 are provided with inclined upper surfaces 250 slanting downwardly from the midportion thereof (FIGURE 7). Each block 240 is also bored and threaded at each of its opposite ends to receive two pairs of adjusting screws 252, each pair of which also passes through the smoothly-drilled downward arms 254 of two pairs of oppositely-tapered L-shaped gibs or wedges 256 having upwardly and inwardly-tapered lower surfaces 258 with flat horizontal upper surfaces 260 slidably engaging the flat lower surfaces 232 on the shelf-like upper arms 28 (FIGURE 12). As a consequence, assuming right-hand threads, when the screws 252 are rotated clockwise (FIGURE 12), the wedges or gibs 256 are moved inward (FIGURE 7), the coaction between the inclined surfaces 250 of the block 240 and the inclined surfaces 258 of the gibs or wedges 246 taking up clearance in a vertical direction and tightly clamping the rods 242 and 244 of the material compacting assembly 18 between the lower and upper shelf-like arms 26 and 28. The lower blocks 238 and bar keys 248 (FIGURES 12 and 14) lack the wedging arrangement 250, 256 just described but are otherwise of similar construction.

The modified compacting assembly 230 is provided with an approximately rectangular die table 260 with a top surface 261 and lower and upper platens 262 and 264 respectively mounted above and below it (FIGURE 12) in sliding engagement with the four guide rods 242. Each is taper-bored around the guide rods 242 to receive tapered bearing bushings 266, each split longitudinally and threaded at its opposite ends to receive correspondingly-threaded opposite adjusting nuts 268 and 270. By tightening one of the nuts 268 and loosening the other nut 270 or vice versa, each tapered bearing bushing 266 may be moved upward or downward in its respective tapered bore so as to increase or reduce the clearance between it and its respective guide rod 242.

As in the compacting assembly 18 of the press 10 of FIGURE 1, the upper platen 264 is bored centrally to receive and be secured to the flanged lower end of the upper outer tubular ram or screw plunger 100 within which, as before, is telescopingly mounted the upper inner tubular ram or screw plunger 102, to the lower end of which is secured the upper punch 272 (FIGURE 12). The modified compacting assembly is shown as employing only one punch 272, because of the particular configuration of the workpiece, instead of the two upper punches 60 and 62 of the assembly 18 of FIGURES 1, 2 and 6 to 11 inclusive.

The upper platen 264 (FIGURE 14) is provided with bores 274 disposed with their centers in the central transverse plane thereof. Bolted to the upper platen 264 above each of the bores 274 is a stop cap 276 (FIGURE 12) which is bored centrally for the passage of its piston rod 244 and on its lower surface is provided with a cup-shaped stepped recess 278 provided with an annular stop shoulder 280. Slidably received within each bore 274 as the upper platen 264 descends is an internally-threaded stop sleeve 282 having an upper stop shoulder 284 engageable with the stop shoulder 280 to cause the upper platen 264 to then transfer its motion to the die table 260 in the manner described below.

The stop sleeve 282 at its lower end is threaded onto the upstanding externally-threaded tubular upward extension 286 of the upper cylinder head 288 which is also bored centrally for the passage of the piston rod 244. The extension 286 is counterbored to receive a conventional packing 290 for preventing leakage of hydraulic fluid around the piston rod 244. The packing 290 is compressed between a flanged lower bushing 292 and an upper annular retainer 294 bolted to the upper end of the extension 286 and threaded externally in continuation thereof for threadedly engaging the internally-threaded stop sleeve 282. An annular flexible flanged wiping ring 296 encircling the stop sleeve 282 excludes dirt. The stop sleeve 282 is provided with peripheral notches or flats (not shown) to receive a spanner or other wrench by which it may be rotated to move it upward or downward relatively to the portions 286 and 294 in order to vary the point at which the upper platen 264 will positively engage the die table 260 through the intermediate agency of the stop sleeve 282 and cylinder head 288 at each end thereof.

The die table 260 at each end and centered in its central vertical plane is provided with a bore 298 (FIGURE 12) containing a cylinder sleeve 300 of wear-resisting material, such as hardened steel which is also highly honed or polished, and this is held in position between each upper cylinder head 288 and a coresponding lower cylinder head 302, both bolted to the die table 260. The upper and lower cylinder heads 288 and 302 are counterbored at the inner ends of angled fluid passageways 304 and 306 respectively which connect with the upper and lower fluid passageways 308 and 310 extending obliquely rearward through the die table 260 (FIGURES 12 and 13). These terminate in a port 312 connected by suitable high pressure hydraulic flexible hose to a hydraulic pressure fluid circuit, such as hydraulic oil under pressure. This circuit contains a spring-centered four-way valve (not shown)

by means of which fluid can be admitted through one of the passageways 304, 310 and discharged at a predetermined pressure from the other fluid passageway 306, 308 and vice versa, as explained below in connection with the operation of the invention.

The cylinder sleeve 300 during its ascent or descent along with the die table 260 is engaged by a compound piston head 314 (FIGURE 12) mounted at the midportion of the piston rod 244, which actually consists of headed halves with their heads or flanges 316 abutting one another and clamped together by the same bolts (not shown) which clamp together the three annular portions of the compound piston head 314 and its annular seals. The lower cylinder head 302, like the upper cylinder head 288, is similarly provided with a flanged bushing 318 and packing 320 in its downward tubular extension 322.

Bolted to the lower end of the extension 322 is a four-lobed stationary stop sleeve 324 having four outwardly-projecting arcuate stop lobes 326 (FIGURE 15). Depending upon the position of a rotary external stop sleeve 330, the external stop lobes 326 register with or clear four corresponding inwardly-projecting arcuate stop lobes 328 mounted inside the rotary external stop sleeve 330 (FIGURE 12). FIGURE 15 at its right-hand side shows the lobes superimposed so as to be in registry whereas its left-hand side shows the lobes out of registry so as to clear one another. From FIGURE 15 it will be seen that the stop lobes 326 and 328 are each spaced circumferentially to occupy one-eighth of the circumference of their respective portions 324 and 330, so that a rotation of forty-five degrees of the external stop sleeve 330 in one direction or the other moves the inwardly-projecting stop lobes 328 into or out of registry with the outwardly-projecting stop lobes 326. In this manner, the die table 260 can be selectively permitted to "float" upward or downward when the stop lobes 326 and 328 are out of registry or brought to a positive halt by them when they are in registry. The lower platen 262 is provided at its opposite ends (FIGURE 15) with inwardly-cutaway portions 331 to afford clearance for passing the stop sleeves 324 and 330.

Bolted or otherwise secured to the lower end of the stop sleeve 330 is a rotary cylindrical block 332 which is held down against the elongated rectangular block 238 by a flanged retaining ring 334 bolted thereto. The rotary block 332 is provided with external notches or flats for the engagement of a wrench or spanner, or is optionally provided with a handle (not shown) for rotating it and the stop sleeve 330 connected to it.

The die table 260, like the die table 18, is centrally bored and counterbored to receive a flanged cylindrical compacting die 336 with a top surface 337 and which in the present instance is bored and counterbored to receive a hollow cylindrical die liner 338, the bore 340 of which constitutes the die cavity. The die 336 and liner 338 are recessed to receive a retaining ring 342 which holds them together. As in the compacting press 10, the bottom of the die cavity 340 is constituted by the upper ends of three telescoping tubular punches, namely lower outer, intermediate and inner tubular punches 344, 346 and 348 respectively, with a core rod 350 within the inner punch 348. The lower tubular punches 344, 346 and 348, as before, are connected respectively to and reciprocated by the lower outer, intermediate and inner telescoping screw plungers 76, 78 and 80 in the manner described above. Similarly, the core rod 350 is provided with a screw connection 182 to the core-rod-operating screw shaft 184 in the manner also described above in connection with FIGURES 1 and 2.

The particular workpiece $W_1$ (FIGURE 19) shown for purposes of exemplification as produced by the modified powdered material compacting assembly 230 has a hollow cylindrical body portion B. This contains an annular bottom groove G which divides its lower portion into outer and inner axially-extending annular flanges $F_1$ and $F_2$, the outer and inner surfaces which are determined by the die bore 340 and core rod 350 respectively.

*Operation of modified powdered material compacting assembly*

The operation of the modified compacting material assembly 230, when placed in the briquetting press 10 of FIGURES 1 and 2 in place of the powdered material compacting assembly 18, follows a similar action, with certain differences determined by the nature of the modified workpiece $W_1$. The top of the core rod 350 is initially positioned level with the top of the die table 260 by suitably operating the motor 190 (FIGURE 1) to rotate the gear nut 186 and move the core rod operating screw shaft 184 upward. The outer stop sleeves 330 are rotated into non-registering or clearing positions as shown at the left-hand side of FIGURE 15. The internally-threaded stop sleeves 282 are also moved upward by rotating them relatively to the tubular extensions 286 of the upper cylinder heads 288 to position their upper ends 284 at the desired halting position for the upper platen 264. As in the operation of the compacting assembly 18, as shown in FIGURES 6 to 11 inclusive, the lower outer, intermediate and inner tubular punches 344, 346 and 348 are retracted to their maximum depths by operating the lower outer, intermediate and inner screw plungers 76, 78 and 80 respectively, and the upper punch 272 retracted to its maximum height by operating the upper outer and inner tubular screw plungers 100 and 102.

During the first or filling step of operation, the motor 74 (FIGURE 2) is actuated, as described above, to move the filling shoe 66 over the die cavity 340 (FIGURE 12) as it did over the die cavity 64 in FIGURE 6, whereupon the powdered material P as before, falls into the die cavity 340. The control circuit, operated in a suitable way as by a tape, then reverses the motor 74 to retract the filling shoe 66 to its rearward position shown in FIGURE 2, leaving the die cavity 340 filled loosely but accurately with powdered material P. The die table 260 thus far remains with its upper surface 261 and the upper surface 337 of the die 336 coincident with the starting level 35.

The upper actuating mechanism assembly 16 is now operated to move the upper punch 272 downward into the die cavity 340 while the core rod 350 is moved upward above the top surface 337 of the die 336 (FIGURE 18) where it telescopes with the upper punch 272. This action partially compresses the powdered material P in the die cavity 340 and causes it to fill all portions thereof, including the recesses formed between the intermediate punch 346 and the die liner 338 and core rod 350 respectively (FIGURE 12). The lower outer, intermediate and inner screw plungers 76, 78 and 80 (FIGURE 12) are now operated to move the lower outer, intermediate and inner tubular punches 344, 346 and 348 upward (FIGURE 18) while the upper punch 272 is caused to move further downward (FIGURE 18), further compressing the powdered material in the die cavity 340. Meanwhile, the hydraulic fluid within the cushioning cylinders 300 at their lower ends is permitted to escape at a controlled predetermined pressure through the lower passageways 206 and 308 while hydraulic fluid is admitted to the passageways 310 and 304 to fill the space at the upper ends of the cylinders 300, permitting the cylinders 300 to yieldingly move downward past the stationary piston heads 314, carrying with them the die table 260. While this occurs, the outwardly-projecting lobes 326 of the inner stop sleeve 324 move downward past the spaces between the inwardly-projecting lobes 328 of the outer stop sleeve 330, which, as previously stated, are in the non-registering open positions shown at the left-hand side of FIGURE 15.

Under these conditions, the upper platen 264 and die table 260 continue to move downward until the internal annular shoulders 280 within the caps 276 engage the upper ends 284 of the screw stop sleeves 282, positively halting the descent of both the upper platen 264 and die table 260 together with the upper punch 272. The various punches 272, 344, 346, 348 and core rod 350 now occupy the relative positions shown in FIGURE 18, with compacting accomplished.

Ejection of the compacted workpiece $W_1$ is now accomplished by direct stripping, in contradistinction to the reverse stripping carried out in the description of the operation of the compacting assembly 18 of FIGURES 1 an 6 to 11 inclusive. To do this, the upper outer and inner punches 100 and 102 are operated to retract the upper punch 272 and upper platen 264 to their uppermost positions shown in FIGURE 12. The core rod 350 is also retracted downward until its top is level with the top surface 337 of the die 336, by reversely operating the motor 190 (FIGURE 1) to move the core rod screw shaft 184 downward (FIGURE 19).

The lower outer, intermediate and inner tubular punches 344, 346 and 348 are now moved upward until the upper ends of the punches 344 and 348 are level with the upper surface 337 of the die 336 while the top of the lower intermediate punch 346 moves above the level 337, thereby directly ejecting the workpiece $W_1$ from the die cavity 340 (FIGURE 19). The workpiece $W_1$ is then removed, and the hydraulic pressure fluid admitted through the passageways 306 and 308 to the lower ends of the cylinders 300 while permitting discharge of hydraulic fluid through the passageways 304 and 310 at the upper end thereof, thereby causing the cylinders 300 to rise, carrying with them the die table 260 while the piston heads 374 and piston rods 244 remain stationary, until the top surfaces 261 and 337 of the die table 260 and die 336 return to coincidence with the starting level 35. The lower outer, intermediate and inner punches 344, 346 and 348 and core rod 350 are then moved downward to the extent necessary to again form the maximum depth of the die cavity 340, as shown in FIGURE 12. With the upper punch 272, upper platen 264 and its stop caps 276 in their raised positions of FIGURE 12, constituting their starting positions, the modified powdered material compacting assembly 230 is then ready to execute another cycle of operation, commencing with the advancement of the filling shoe 66 over the die cavity 340 to fill the latter with loose powdered material P, as before.

During operation of either of the forms of the invention shown in FIGURES 1 and 12 respectively, the previously-mentioned spring-centered four-way valve (not shown) which controls the admission and discharge of fluid to and from the opposite ends of the cushioning cylinders is shifted to midposition to block both such admission and discharge so as to hold the die table stationary against the frictional drag of the upper punch or punches against the side walls of the die cavity and core rod during retraction of the upper punch or punches and subsequent ejection of the workpiece from the die cavity. These cushioning cylinders and their associated hydraulic circuits are the only hydraulic equipment used in conjunction with either of the forms of the present invention of FIGURES 1 and 12 respectively.

It will be understood that to provide variable speeds for the various electric motors 74, 116, 192 and 190 (FIGURES 1 and 2) direct current motors are most conveniently used even though it ordinarily necessitates the additional provision of a direct current dynamo driven by an alternating current motor from the alternating current supply most frequently found in industrial establishments. Such variable speeds increase the versatility of the press because of the fact that in high fills or complicated workpieces, the moving parts of the press must be slowed down so that the powdered material will flow properly into the various parts of the die cavity. Moreover, by the provision of the various clutches, shown as magnetic clutches but optionally employing other forms of clutches, the maximum power can be obtained from a single motor where otherwise separate reversible individual motors would have to be used, each of maximum power capacity.

The reason for this lies in the fact that it is seldom necessary to propel any two of the screw plungers at a single time with full tonnage applied thereto. Ordinarily, in the majority of workpieces, the top of the workpiece receives the full tonnage of the press because it ordinarily constitutes the full area of the workpiece unless there are holes in the workpiece. For the same reason, the bottom of the workpiece where provided with flanges, ordinarily receives less applied tonnage because of the smaller individual areas involved.

Furthermore, in the modified form of the invention shown in FIGURE 12, the stationary piston rods 244 also serve as guide rods in addition to the guide rods 242. The internally-threaded stop sleeves 282 on the externally-threaded upward extensions 286 of the upper cylinder heads 288 mounted on the die table 260 when engaged by the stop shoulders 280 of the stop caps 276 on the upper platen 264 are depended upon to halt the descent of the die table; but, in addition, just before these come into engagement, the yielding pressure within the cushioning cylinder 300 is automatically raised suddenly in order to provide an opposing resistance exceeding the force exerted by the descending die table 260 and upper platen 240. This arrangement is sufficiently accurate to provide accurate dimensions for the workpiece, and, when reversed, to provide sufficiently accurate ejection of the workpiece, because the minute amount of compression of the oil which constitutes the hydraulic working fluid is negligible. The stop arrangement provided by the externally-lobed disc 324 and the rotary internally-lobed sleeve 330 is made use of only when the nature of the workpiece does not require the cushioned or yielding descent of the die table 260, so that a fixed and immovable die table results.

I claim:
1. A powdered material briquetting press, comprising
   a press frame formation,
   a die table mounted on said press frame formation intermediate the opposite ends thereof and adapted to receive a die,
   lower screw plunger means and upper screw plunger means mounted on said frame formation for movement upward and downward toward and away from said die table and adapted to receive upper and lower punches respectively,
   lower and upper actuating mechanism assemblies including screw elements threadedly engaging said lower and upper screw plunger means for relative rotation therebetween effecting motion of said screw plunger means independently of one another toward and away from said die table,
   and motor means drivingly connected to said mechanism assemblies, at least one of said screw plunger means including a plurality of independently-movable telescoping punch-operating screw plungers and independent screw elements threadedly engageable therewith.
2. A powdered material briquetting press, according to claim 1, wherein said screw plungers are tubular, wherein an independently-movable core-operating screw plunger is mounted within said punch-operating screw plungers and is adapted to be connected to a core element, wherein an additional screw element threadedly engages said core-operating screw plunger for relative rotation therebetween, and wherein driving means is provided for effecting said last-mentioned relative rotation.
3. A powdered material briquetting press, according to claim 1, wherein said actuating mechanism assemblies include forward and reverse power transmission devices, and also include magnetic clutches selectively transmitting power forwardly and reversely to said screw plunger means.
4. A powdered material briquetting press, according to claim 1, wherein said screw elements in at least one of said actuating mechanism assemblies include rotary gear nut means threadedly engaging their respective screw plunger means.

5. A powdered material briquetting press, according to claim 1, wherein said lower screw plunger means includes outer, intermediate and inner tubular telescoping punch-operating screw plungers movable independently of one another and each adapted to be connected to an individual independently-movable tubular lower punch.

6. A powdered material briquetting press, according to claim 5, wherein an independently-movable core-operating screw plunger is mounted within said inner screw plunger and is adapted to be connected to a core element, and wherein an additional motor-operated driving mechanism independent of said motor means is drivingly connected to said core-operating screw plunger.

7. A powdered material briquetting press, according to claim 1, wherein said upper screw plunger means includes outer and inner tubular telescoping screw plungers movable independently of one another and each adapted to be connected to an individual independently-movable tubular upper punch.

8. A powdered material briquetting press, according to claim 1, wherein lower and upper platens are connected to said lower and upper screw plunger means, wherein elongated platen guide members are mounted in laterally-spaced parallel relationship within said press frame in guiding engagement with said platens, and wherein means is provided for detachably and removably securing the opposite ends of said guide members to said frame formation.

9. A powdered material briquetting press, according to claim 8, wherein said frame formation includes a pair of frame formation side structures disposed in laterally-spaced realtionship and having longitudinally-spaced pairs of frame formation projections thereon with the projections of each pair extending laterally inward toward and in alignment with one another, and wherein said opposite ends of said guide members are detachably and removably secured to said projections.

10. A powdered material briquetting press, according to claim 1, wherein said die table is movably mounted on said press frame formation for travel relatively thereto, and wherein there are provided stop devices selectively engageable with and disengageable from said die table for selectively permitting travel thereof beyond and halting travel thereof at a predetermined location in said press frame formation.

11. A powdered material briquetting press, according to claim 10, wherein certain of said stop devices include pairs of stop elements with laterally-projecting lobes therein with one stop element of each pair being connected to said die table for travel therewith and the other element of each pair being rotatably mounted at a predetermined location on said press frame formation for rotation of its lobes selectively into and out of registry with the lobes of the die-table-connected stop elements.

12. A powdered material briquetting press, according to claim 1, wherein elongated platen guide members are mounted on said press frame formation in laterally-spaced parallel relationship, wherein an upper platen is connected to said upper screw plunger means for actuation thereby in guided engagement with said guide members, wherein said die table has an extensible and retractable stop therein, and wherein said upper platen has a stop abutment therein engageable with said die table stop at a predetermined distance of separation of said upper platen from said die table.

References Cited
UNITED STATES PATENTS

| | | | |
|---|---|---|---|
| 2,370,622 | 3/1945 | Gastrow | 18—16 X |
| 2,398,227 | 4/1946 | Hubbert | 18—16.5 |
| 2,509,783 | 5/1950 | Richardson | 18—16.7 |
| 2,561,735 | 7/1951 | Haller | 18—16.5 |
| 2,608,826 | 9/1952 | Haller. | |
| 2,651,180 | 9/1953 | Haller | 18—16 X |
| 2,711,561 | 6/1955 | Stüdli | 18—30 |
| 2,762,078 | 9/1956 | Haller | 18—16.5 |
| 2,810,929 | 10/1957 | Willi | 18—16.7 |
| 3,093,863 | 6/1963 | Ehlert | 18—30 |
| 3,104,433 | 9/1963 | Hoern | 18—30 X |
| 3,121,919 | 2/1964 | Turner | 18—16 X |
| 3,154,812 | 11/1964 | Haller | 8—16.7 |
| 3,172,156 | 3/1965 | Belden | 18—16.7 |
| 3,184,810 | 5/1965 | Hoern | 18—30 X |
| 3,188,759 | 2/1965 | Johannigman | 18—16.7 |
| 3,191,232 | 6/1965 | Haller | 18—16.7 |
| 3,191,235 | 6/1965 | Rougement | 18—30 X |

J. SPENCER OVERHOLSER, *Primary Examiner.*

HOWARD J. FLINT, JR., *Examiner.*